United States Patent [19]

Podhrasky

[11] Patent Number: 5,148,151
[45] Date of Patent: Sep. 15, 1992

[54] METAL DETECTOR HAVING TARGET CHARACTERIZATION AND SEARCH CLASSIFICATION

[75] Inventor: Robert J. Podhrasky, Dallas, Tex.

[73] Assignee: Garrett Electronics, Inc., Garland, Tex.

[21] Appl. No.: 541,151

[22] Filed: Jun. 20, 1990

[51] Int. Cl.⁵ .................................. G08B 13/14
[52] U.S. Cl. .................... 340/572; 324/329; 340/691
[58] Field of Search ............ 340/572, 525, 691, 658, 340/825.7; 324/329; 364/516; 446/129

[56] References Cited

U.S. PATENT DOCUMENTS

| | | | |
|---|---|---|---|
| 4,334,191 | 6/1982 | Podhrasky | 324/329 |
| 4,507,612 | 3/1985 | Payne | 324/329 |
| 4,677,384 | 6/1987 | Payne | 324/329 |
| 4,700,139 | 10/1987 | Podhrasky | 324/329 |
| 4,868,910 | 9/1989 | Maulding | 324/329 X |

OTHER PUBLICATIONS

"VLF 553D Detector", Fisher Research Laboratory, Issue VLF977, 1977.

Primary Examiner—Jin F. Ng
Assistant Examiner—Thomas J. Mullen, Jr.
Attorney, Agent, or Firm—Richards, Medlock & Andrews

[57] ABSTRACT

A metal detector is provided with circuitry for producing a plurality of vector signals derived from a target signal. Each of these vector signals corresponds to a phase characteristic of target signals. These vector signals define phase ranges which correspond to classifications of targets. Upon detection of a target signal, the metal detector generates first and second phase detected signals which in turn generate a plurality of vector signals. These vector signals are digitized and within a microprocessor a determination is made through slope analysis to determine which range includes the principal phase of the detected target signal. The vector signals which define the identified range are then utilized in algebraic calculations to define one of a plurality of subphase ranges within each range. This identified subphase range identifies a segment in a linear display which is illuminated to show the determined characteristic for the detected object. An operator can program the detector to select or reject target objects having certain electrical characteristics and this is likewise displayed to the operator. When the detector determines that a target signal has the same characteristics as selected by the operator, an audio output is generated. The display provided to the operator enables the operator to easily select or reject specific signal characteristics pertaining to certain types of targets.

7 Claims, 8 Drawing Sheets

METAL DETECTOR HAVING TARGET CHARACTERIZATION AND SEARCH CLASSIFICATION

FIELD OF THE INVENTION

The present invention pertains in general to metal detectors and in particular to a metal detector which can permit the operator to classify the search parameters for targets and characterize the targets which have been located.

BACKGROUND OF THE INVENTION

It has been well established that metal detectors can identify targets to some degree based upon their physical composition due to the phase characteristics of a receive signal produced when the target object is in the field of an electromagnetic signal. Patents which illustrate target identification based upon phase include U.S. Pat. Nos. 4,334,191 to Podhrasky, 4,700,139 to Podhrasky and 4,507,612 to Payne.

Various metal detectors have been marketed which provide for target selection by operator classification. A representative product of this type is the Model "Eagle II" manufactured by White's Electronics of Sweethome, Oreg. In the operation of this metal detector, the operator can select target characteristics over a range of 1 to 100. This metal detector assigns a response number to targets based upon their electrical characteristics. The operator can program the detector to have selected search numbers which correspond to certain physical characteristics of desired targets. When the White's "Eagle II" detects an object and classifies it with the same number as has been previously selected by the operator, an audio output is produced along with a visual display indicating a match between the operator's programmed selection and the classification of a particular target. The display and operation, however, are principally numerical, with limited word indicators for target type, and the operator must relate particular numbers in the 1 to 100 range for correlation to desired targets.

In view of the desirability of easily classifying targets desired for detection and for indicating the nature of detected targets, there exist a need for a method of operation and a display for a metal detector which makes operation easy and simple for the operator for and provides accurate target classification and response.

SUMMARY OF THE INVENTION

A selected embodiment of the present invention is a target characterization display for a metal detector in which there is produced a detection signal for objects that are present in the region of the detector. The display includes a first set of display segments and an array wherein each of the segments has a first and second display state. A discrimination memory is provided which has respective storage locations for each of the segments of the display. Each of the discrimination memory storage locations corresponds to a unique signal parameter range for targets of the metal detector. The value stored in each of the discrimination memory storage locations corresponds to the display state for the corresponding display segment. There is further included a second set of display segments arranged in an array wherein each of the segments has a first and second display state. The second set of display segments are positioned in proximity to the first set of display segments and there is a correspondence between the segments of the first and second sets. A target memory is provided which has respective storage locations therein for each of the display segments in the second set of segments. The values in the target memory storage locations are derived from the detection signal produced by the metal detector for the target object. The values stored in each of the target memory storage locations corresponds to the display state for the corresponding display segment.

In a further aspect of the present invention, there is provided a method of operation for a signal processing circuit used in conjunction with a metal detector circuit which produces multiple detection signals that represent a target vector signal related to target object composition. This method includes the steps of producing first and second vector signals which are related to the target composition. Next, there are produced a plurality of signals which are algebraic combinations of the first and second vector signals. Each of the vector signals is examined to determine a pair of the vector signals which encompass the phase range of the target vector signal. The pair of vector signals are algebraically combined to produce a target identification value. After production of the target identification value, a determination is made to find a subphase range into which the vector signals for the target is present. This indicates a physical characteristic for the target object.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
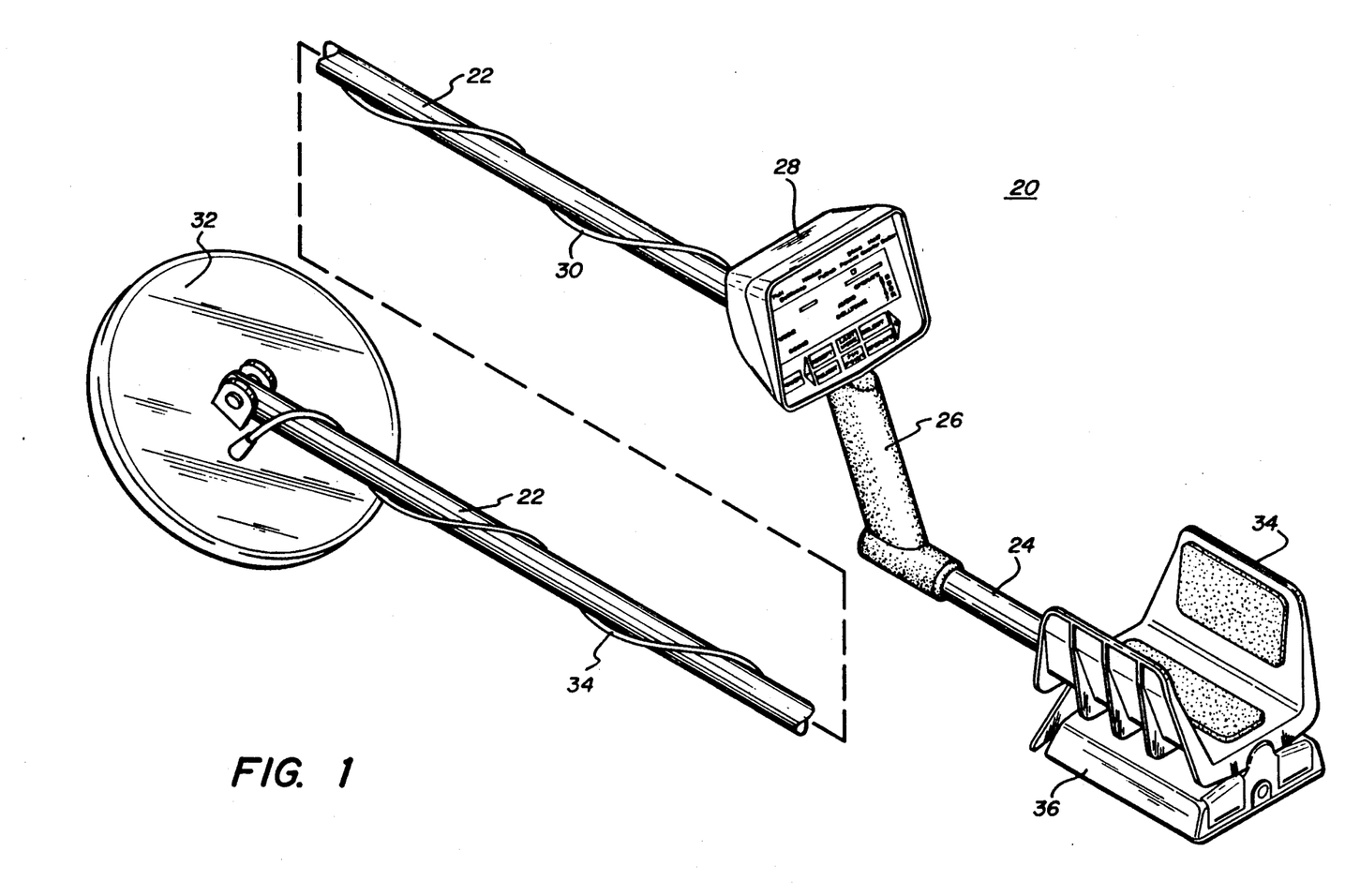
FIG. 1 is a perspective view of a metal detector which incorporates the features of the present invention.

The present invention is a circuit and display for a metal detector, such as a hobby-style metal detector 20 as shown in FIG. 1. The detector 20 includes a first stem section 22, second stem section 24 and an interconnecting hand grip 26. A housing 28 includes electronic detection circuitry, described below, together with a display and an operator touchpad, also described below. The metal detector 20 is provided, with a search coil 32 which is connected via a cable 30 to the electronics within the housing 28. The detector 20 is further provided with an arm rest 34 which is mounted on the stem section 24. A battery and speaker housing 36 is connected to the stem 24 and arm rest 34. A cable, not shown, extends from the housing 36 through the stem 24 and grip 26 to the housing 28 for connection to the electronic circuitry therein. Batteries within the housing 36 provide electrical power for the circuitry, described below. A speaker within the housing 36 provides an audio signal to the operator which is generated by the circuitry within the housing 28.

The present invention is an easily usable metal detector which includes simple programming to select desired targets, a unique display to indicate the targets which have been programmed, as well as a display for classification of targets which have been found. The invention further includes a method of processing signals produced by a target object to provide target classification.

Figure 2:
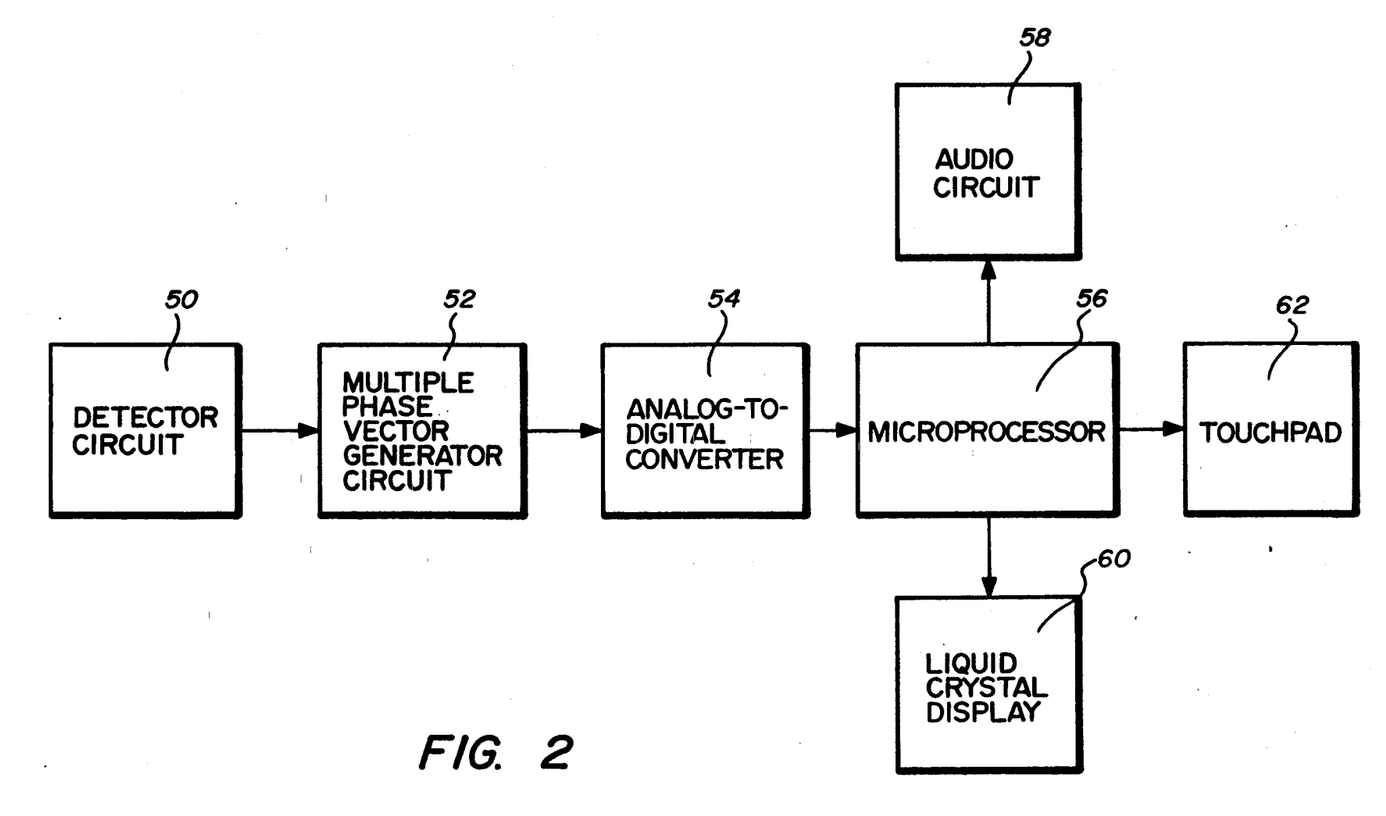
FIG. 2 is a block diagram of the electronic circuitry of the metal detector of the present invention.

The operation of the electronics of the present invention is shown in a general block diagram in FIG. 2. A detector circuit 50 functions in a conventional manner of a balanced induction metal detector to produce first and second phase detected signals. Such a circuit is described in U.S. Pat. No. 4,700,139, filed Oct. 29, 1984, to Podhrasky which is assigned to the assignee of the present application. U.S. Pat. No. 4,700,139, filed Oct. 29, 1984, is herein incorporated by reference.

The output from the detector circuit 50, which corresponds to the signal lines 36 and 38 of U.S. Pat. No. 4,700,139 in FIG. 1 thereof, are input to a multiple phase vector generator circuit 52. This circuit is described in detail in FIG. 3. Circuit 52 produces multiple target vector signals which represent vector components of the detected target signal.

The target vector signals produced by the circuit 52 are provided to an analog-to-digital converter 54 which digitizes the received signals and provides them to a microprocessor 56. A representative microprocessor which functions in accordance with the present invention is a Model MC68HC705 manufactured by Motorola.

Figure 5:
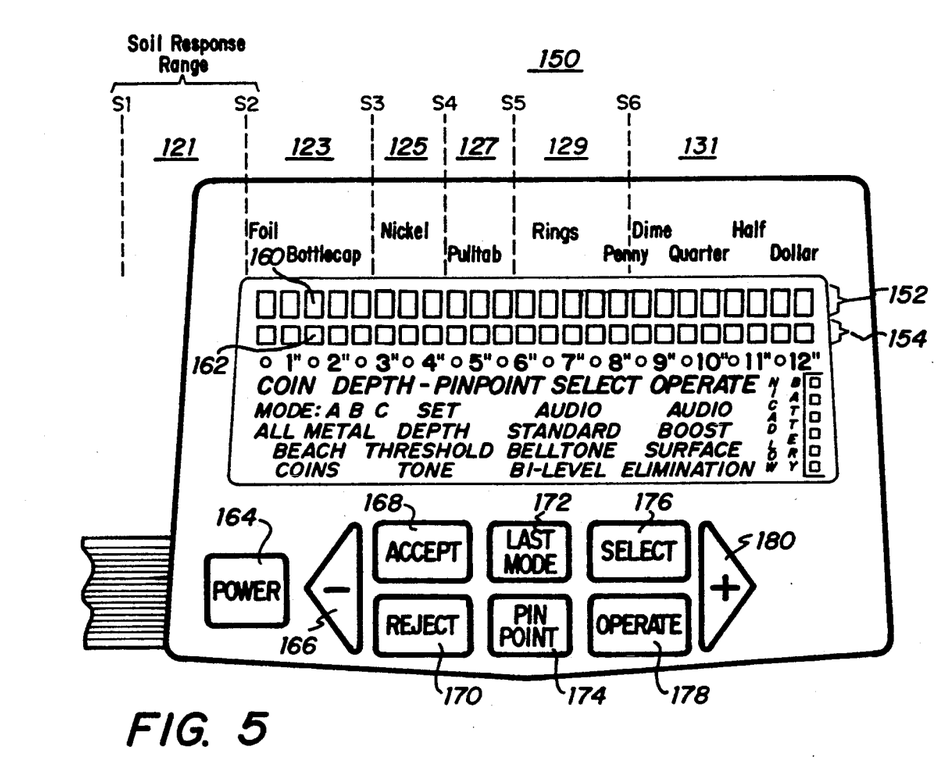
FIG. 5 is an illustration of a liquid crystal display screen and a touchpad for the present invention.

The microprocessor 56 receives operator inputs from a touchpad 62, which is further described, in reference to FIG. 5. A liquid crystal display 60 is driven by the microprocessor 56. This display is further shown in FIG. 5. The microprocessor 56, upon detection of a target signal having certain electrical characteristics and matching a previous discrimination selection, produces a signal that is transmitted to an audio circuit 58 to produce an audio output to an operator. Such an audio circuit is shown in U.S. Pat. No. 4,700,139.

Briefly, in operation, the metal detector 20 is operated such that the search coil is moved over the surface of the ground in the region of a target. The target distorts the electromagnetic field produced by the transmit coil and thereby induces a signal in the received coil. This received signal is phase demodulated to produce two phase detected signals which are provided by detector circuit 50 to the multiple phase vector generator circuit 52. The circuit 52 utilizes these two phase detected signals to produce a plurality of vector signals representing phase components of the original target signal. These are produced by various summations and amplifications of the input signals The vector signals are then input to the analog-to-digital converter 54 for digitization and the resulting digital samples are provided to a microprocessor 56 for evaluation in accordance with selected processing steps which are further described below in detailed flow diagrams.

An operator determines the nature of a desired target and inputs this information through a touchpad 62 while observing the output from the liquid crystal display 60. The microprocessor 56 stores the selection information and displays it to the operator through the liquid crystal display 60. The operator initiates the searching procedure by inputting a command through the touchpad 62. When the microprocessor determines that a target signal has been produced which has the characteristics previously selected by the operator, this will be indicated both on the liquid crystal display, 60 and by means of an audio tone which is generated through the audio circuit 58. A further detailed description of the metal detector in accordance with the present invention is provided in reference to the descriptions of the following Figures.

Figure 3:
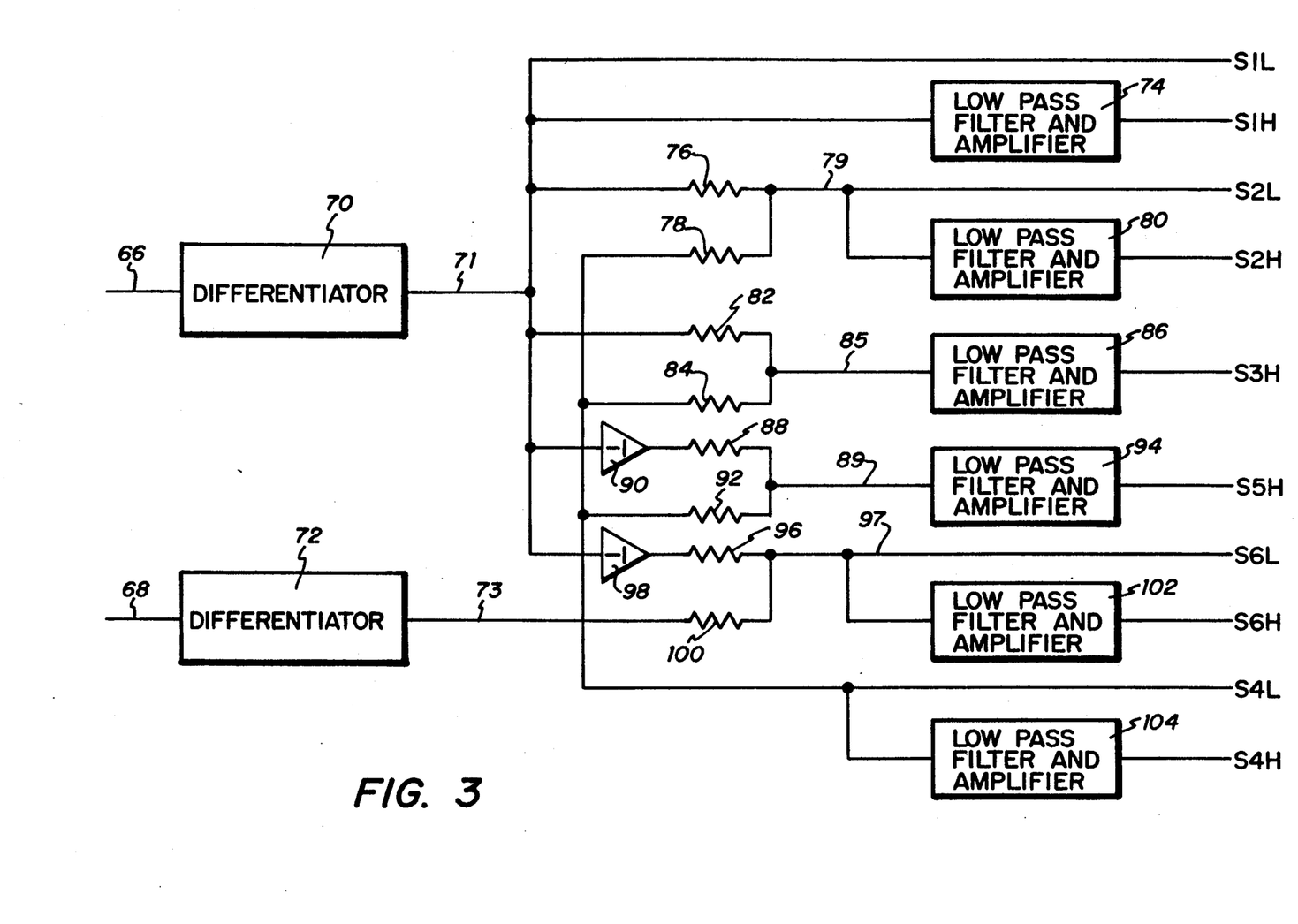
FIG. 3 is a schematic circuit illustration of the multiple phase vector generator circuit shown in FIG. 2.

The multiple phase vector generator circuit 52, introduced in FIG. 2, is described in detail in FIG. 3. Signals at lines 66 and 68 are first and second phase detected signals which are produced as described in reference to U.S. Pat. No. 4,700,139 at lines 36 and 38 shown in FIG. 1 thereof. The phase detected signal at line 66 is provided to a differentiation circuit 70 which produces a second derivative of the input signal and provides this second derivative signal at an output line 71. The phase detected signal at line 68 is provided to a differentiation circuit 72 which likewise provides a second derivative signal at an output line 73. The signal at line 71 is designated as S1L which stands for signal 1, low amplitude. The signal at line 71 is input to a low pass filter and amplifier 74 which produces a signal termed S1H which is a low pass filtered and amplified signal derived from the signal S1L.

The signal at line 73 is designated as S4L. The S1L signal is transmitted through a resistor 76 and the S4L signal is transmitted through a resistor 78 to a line 79 to produce a signal S2L. The S2L signal is transmitted through a low pass filter and amplifier 80 to produce a signal S2H.

The S1L and S4L signals are likewise transmitted through respective resistors 82 and 84 to a line 85 to produce a summation signal which is transmitted through a low pass filter and amplifier 86 which produces a signal S3H.

The S1L signal at line 71 is transmitted through an inverter 90 and a resistor 88 to a line 89. The S4L signal is provided through and a resistor 92 to the line 89 for summation with the S1L signal. The resulting summation signal at line 89 is transmitted through a low pass filter and amplifier 94 to produce a signal S5H.

The S1L signal at line 71 is also transmitted through an inverter 98 and a resistor 96 to a line 97. The S4L signal at line 73 is transmitted through a resistor 100 for combination with the S1L signal at line 97 to produce a signal S6L. The S6L signal at line 97 is provided to a low pass filter and amplifier 102 for production of a signal S6H.

As described above, the "H" signals are amplified and filtered versions of the corresponding "L" signals. The signals S1L, S1H, S2L, S2H, S3L, S4L, S4H, S5H, S6L and S6H are target vector signals which represent selected phase components for target signals Without the "H" and "L" designations, the signals are S1, S2, S3, S4, S5 and S6.

Figure 4:
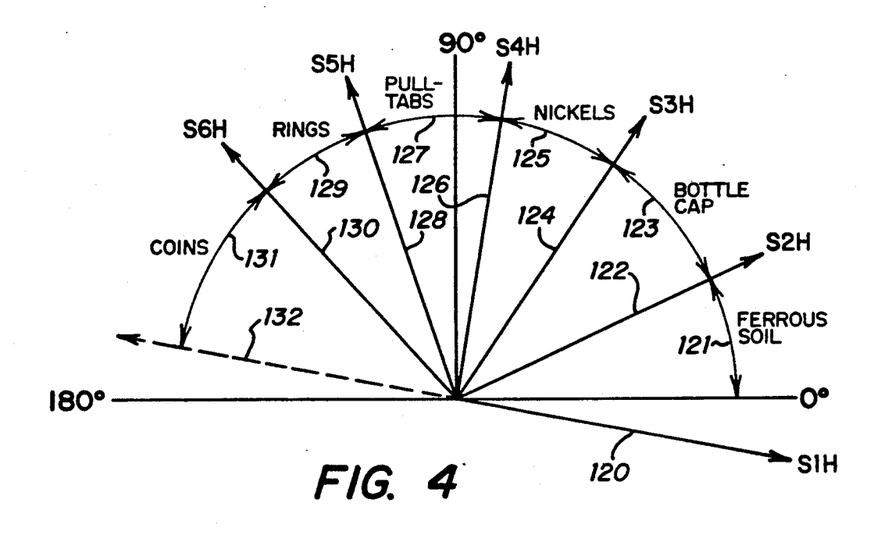
FIG. 4 is a diagram illustration of the vector signals produced by the phase vector signals produced by the phase vector generator circuit shown in FIG. 3.

Further referring to FIG. 4, there is illustrated a phase diagram which represents target vector signals produced by the circuit 52 and a definition of targets which would correspond to the vector signals. The signals S1H, S2H, S3H, S4H, S5H and S6H correspond respectively to vectors 120, 122, 124, 126, 128 and 130. The vectors define ranges as shown in the vector diagram. The vectors 120 and 122 define a range 121 which essentially includes the responses of soil with nonconductive iron content as well as soil with moderate conductive components. The vectors 122 and 124 define a vector range 123 which defines a range of responses which include targets such as bottle caps. The vectors 124 and 126 define a range 125 which includes targets such as nickels. The vectors 126 and 128 define a range 127 which includes targets such as pull-tabs. The vectors 128 and 130 define a vector range 129 which includes targets such as rings. Finally, the vector 130 and line 132 define a phase range 131 which includes targets such as highly conductive coins. These phase ranges are related to display segments which are shown in FIG. 5.

Referring to FIG. 3, the resistor values are as follows:
Resistor 76 = 22K ohms
Resistor 78 = 270K ohms
Resistor 82 = 22K ohms
Resistor 84 = 4.9K ohms
Resistor 88 = 68K ohms
Resistor 92 = 47K ohms
Resistor 96 = 47K ohms
Resistor 100 = 47K ohms A further significant aspect of the present invention is a display 150 which is illustrated in FIG. 5. The display includes a linear array 152 of target indication segments, one of which is segment 160 It further includes a linear array 154 of discrimination segments, one of which is segment 162. The segments in arrays 152 and 154 are preferably liquid crystal display segments which have first and second display states, namely light and dark corresponding to reflective and nonreflective states.

The signals S1, S2, S3, S4, S5 and S6 are marked on FIG. 5 together with the ranges 121, 123, 125, and 127, 129 and 131. These target vector signals and ranges correspond to sections of the display for the arrays 152 and 154. The target array 152 segments are illuminated by the microprocessor 56 when a target signal is classified in one of the categories corresponding to one of the twenty-four segments.

The array 154 segments are selected by an operator to define particular targets for which the operator wishes to either receive an audible notification when they are detected or wishes to specifically reject.

The metal detector 20 has various modes of operations which are indicated on the display 150 by the operational indicators "COIN DEPTH", "PINPOINT SELECT" and "OPERATE".

The display 150 further includes various operational modes and programming features which are indicated by words.

The operator provides inputs to the microprocessor 56 by operation of a touchpad 62. The touchpad 62 includes a power key 164, a negative increment key 166, an accept key 168, a reject key 170, a last mode key 172, a pinpoint key 174, a select key 176, an operate key 178 and a positive increment key 180. Operation of the subject metal detector in conjunction with the display 150 is further described below.

Figures 6, 8:
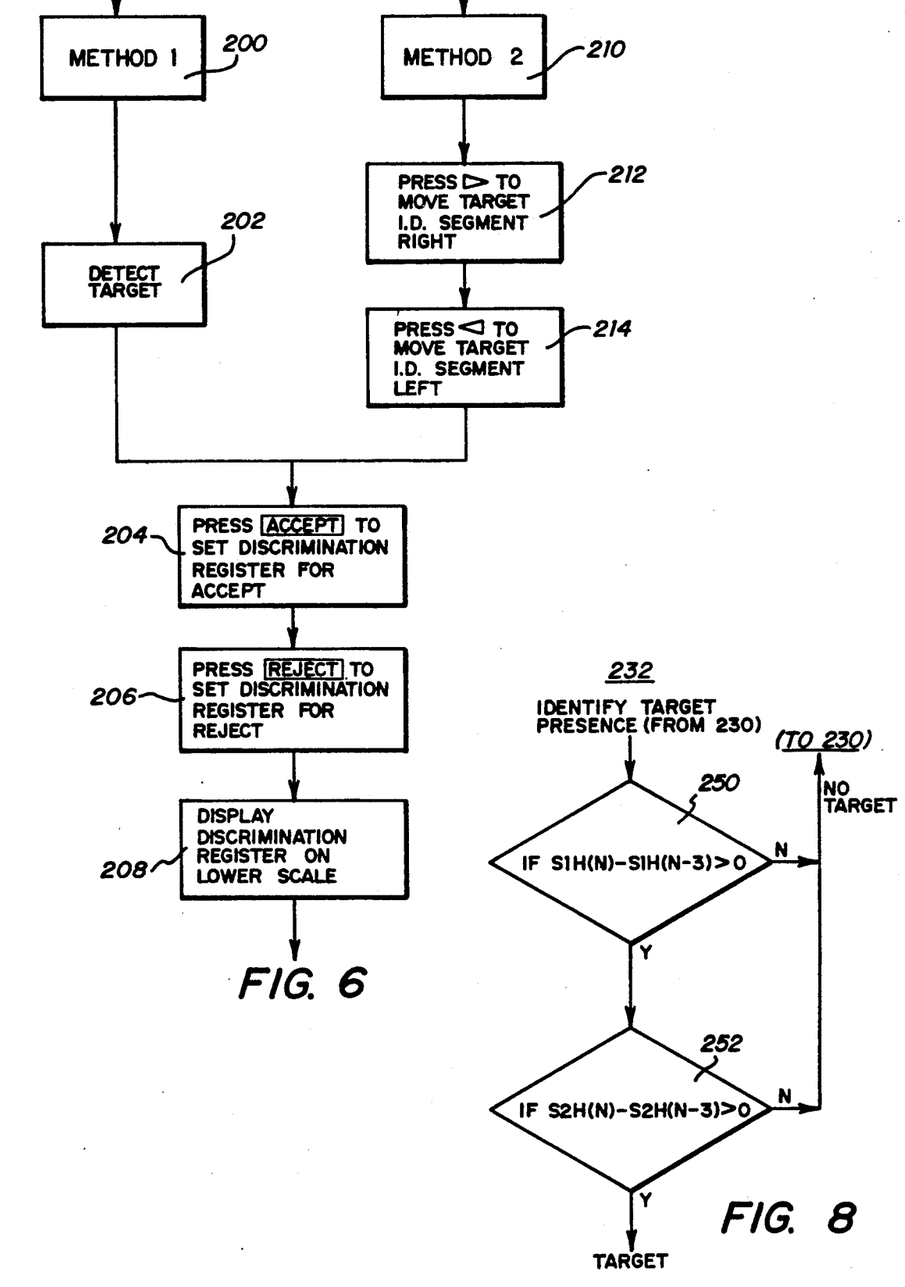
FIG. 6 is a flow diagram illustrating the steps of initializing the operation of the metal detector of the present invention to set target discrimination.
FIG. 8 is a detailed flow diagram representing the processes carried out in operational block 232 introduced in FIG. 7 for identifying the presence of a target.

Referring now to FIG. 6, there is illustrated a flow diagram for discrimination selection setup of the metal detector 20 in accordance with the present invention. Target discrimination can be implemented for either accepting specifically defined targets or rejecting specifically defined targets. This further can be done by either first or second methods as described herein. Basically, the operator can (1) accept or reject a specifically defined signal target type or (2) physically detect the target through operation of the metal detector 20 and following classification of the target select whether that type of target is to be accepted or rejected.

Further referring to FIG. 6, entry is made to an operational block 200 for implementing method one or an operational block 210 for implementing method two. In method one, operation is transferred to an operational block 202 in which the operator utilizes the metal detector 20 in the operate mode to actually detect a target object. When this is done, the microprocessor 56 displays an activated segment within the segments of array 152 to indicate the classification of the target. This could be, for example, segment 160. This would indicate detection of an object such as foil or a bottle cap. Continuing to an operational block 204, the operator can then depress either the +key 180 to set a discrimination register, a register corresponding to the display segment 154, to accept the target or can enter operational block 206 and depress the −key 166 to set the discrimination register for rejecting that particular type of target. Continuing to an operational block 208, the appropriate ones of the discriminator segments 154 are illuminated to indicate that the discrimination register has been set to either accept or reject targets that have a corresponding classification. Following the completion of method one, the operation transfers from block 208 to an exit to await a further operator selection. This discrimination register is either a register in the microprocessor 56 or a logical register in the microprocessor software.

Further referring to FIG. 6, if method two is selected for discrimination programming, entry is made to the operational block 210 and further to an operational block 212. Within the block 212, the positive increment key 180 is depressed to move an illuminated segment of the array 154 to the right as indicated by the corresponding arrow for the key 180. For each illuminated segment of array 154, such as segment 162, the operator can determine whether to accept or reject that particular type of target. Continuing to an operational block 214, the operator has the option of moving the key 166 to the left for making target discrimination selection. Following the operational block 214, the procedure continues through the previously described operational blocks 204, 206 and 208 for the operator to press either of keys 168 or 170 to set the discrimination register to either accept or reject the determined type of target. Further, after such a selection is made, the discrimination segments of array 154 are appropriately set and illuminated.

Thus, in FIG. 6, the metal detector 20 is set up by the operator to selectively accept or reject target signals which have been classified, as further described below. The display 150 indicates in array 154 which segments (target types) have been selected. This is discrimination selection.

Figure 7:
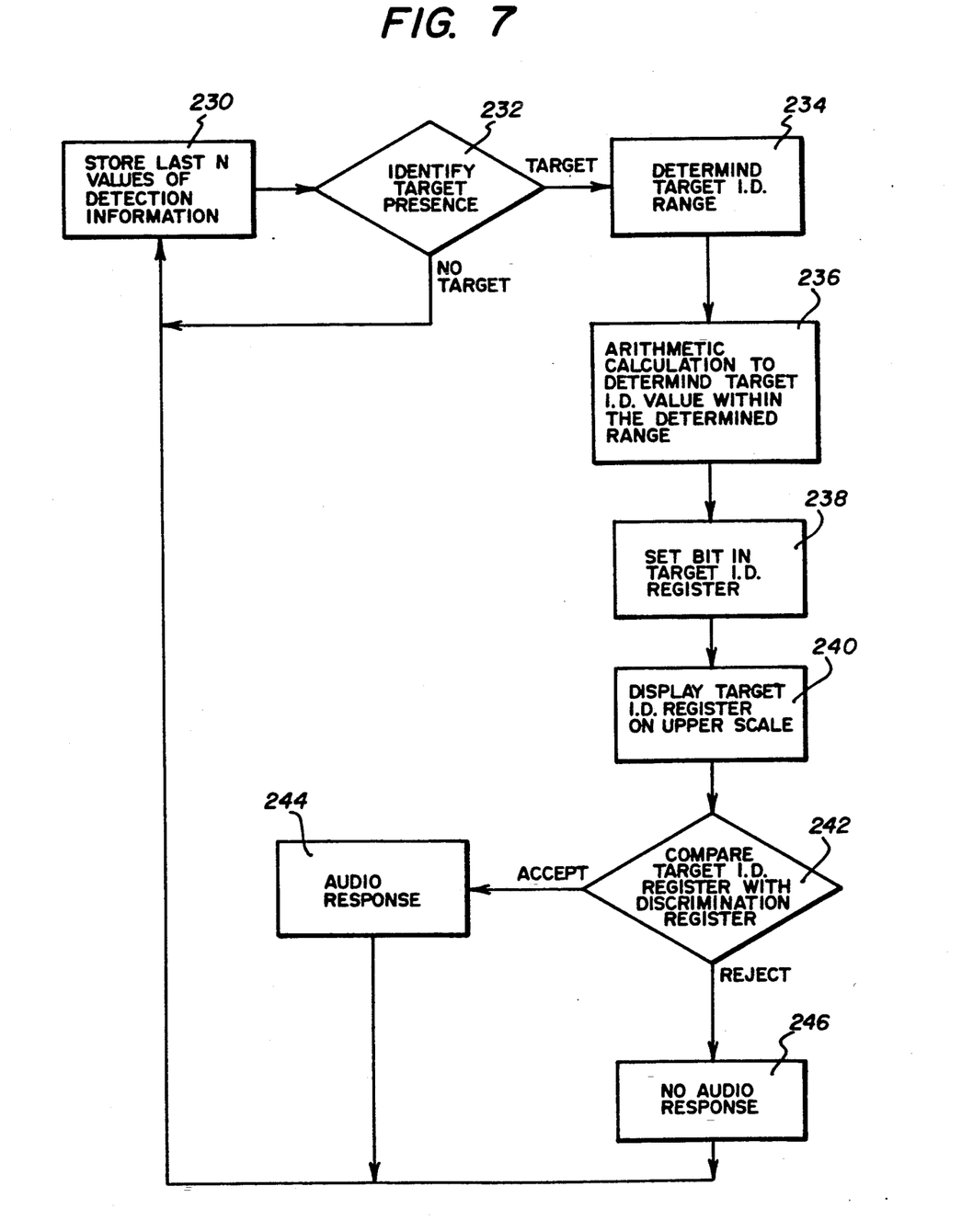
FIG. 7 is a block diagram for the operational aspects of invention as applied to the microprocessor 56 for determining the target identification value, that is subphase range, for a target signal.

The functional operation of the microprocessor 56 for evaluating signals provided by the circuit 52 and producing the segment illumination for segments of array 152 and array 154, as well as for the control signal for the audio circuit 58 is shown in the flow diagram illustrated in FIG. 7. Operation is begun with an operational block 230 in which the detector 20 receives the digital signals from the analog-to-digital converter 54 and stores the last N values of detection information. For the present embodiment, this comprises the last four samples of each of the ten vector signals which have been received for the target signal. The group of ten signals are sampled every five milliseconds. Thus, the processing is carried out after the target signals have been collected. However, this is done in a very fast processing technique such that the response to the operator occurs within a very short human response time.

Continuing to a decision block 232, an inquiry is made to determine if a target is present within the received signal. This operation is described in more detail in reference to FIG. 8. If no target is detected, the exit is taken from the block 232 to return control to the block 230. Thus, the microprocessor metal detector 20 cycles between the blocks 230 and 232 receiving and processing the information to detect the existence of a target when in the operating mode. If a target is detected, as determined by the decision block 232, exit is taken through the target exit to an operational block 234.

Figure 9:
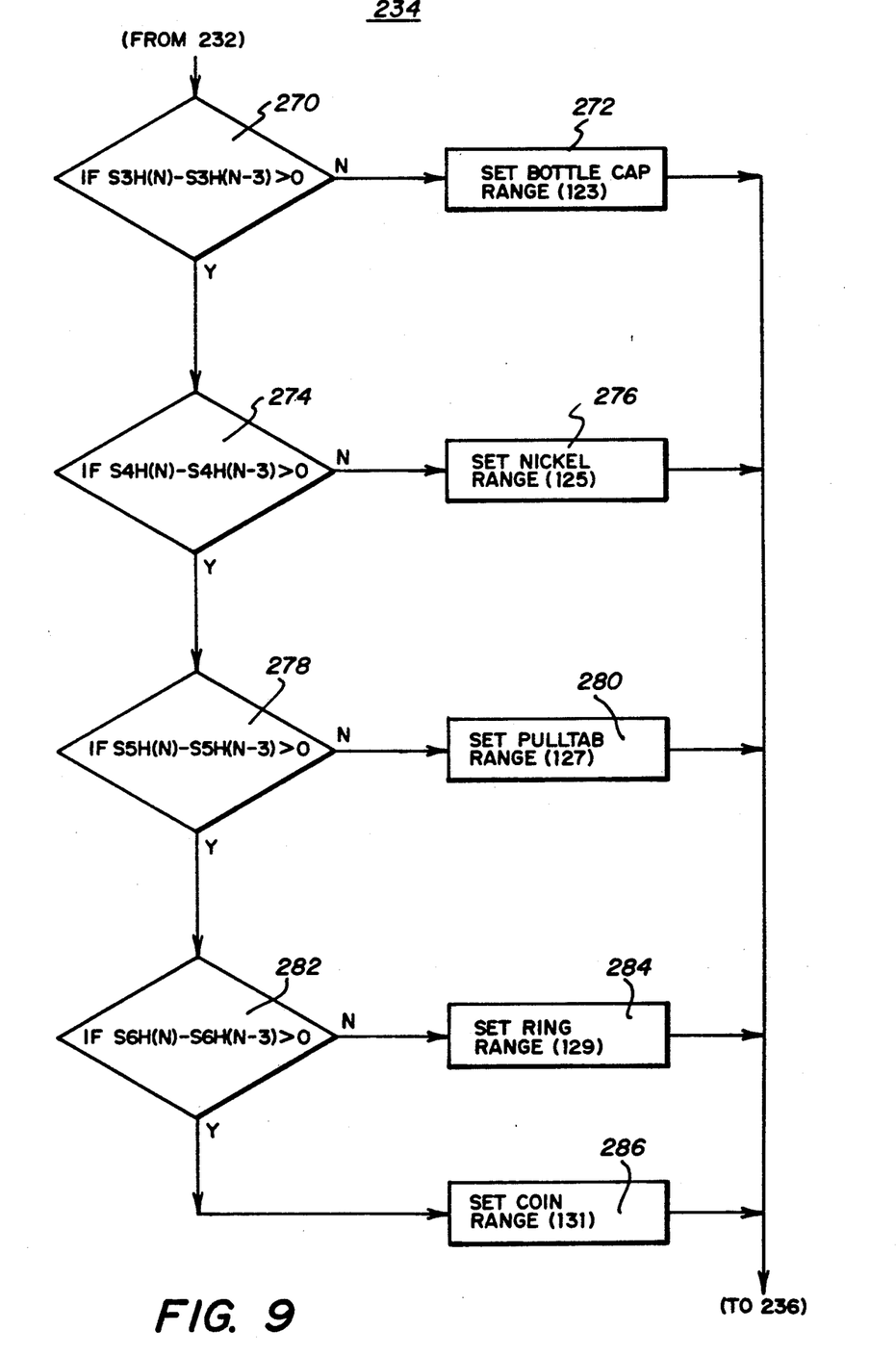
FIG. 9 is a detailed flow diagram representing the operations carried out in block 234, shown in FIG. 7, for determining into which the target signal is classified.

Within the operational block 234, a determination is made for the target ID range for the received target signal. This is a classification of the target signal to be within one of the ranges 121, 123, 125, 127, 129 and 131 as described above and shown in FIGS. 4 and 5. A detailed flow diagram illustrating this operation and the method of determining the particular target ID range is shown in FIG. 9.

After the target ID range has been determined, control is transferred to an operational block 236 in which arithmetic calculations are carried out to determine the target ID value within the previously determined range. This is done using the two vectors which define the selected range. The operations carried out in operational block 236 are described in detail in reference to a detailed flow diagram in FIG. 10. The result of the processing carried out in operational block 236 is an identification of a target ID value which is a value that corresponds to one of the twenty-four segments within the target segments of array 152. Note that each of the ranges is subdivided into categories which are termed "target ID values". Each of these values corresponds to a segment of the display array 152 and also to a segment of the display array 154.

After the target signal has been classified down to the level of a target ID value, control is transferred to an operational block 238 in which the microprocessor 56 sets a bit in a target ID register which corresponds to one of the segments of array 152. Each of the segments within the segments of array 152 corresponds to a particular target ID value. A target ID register is provided which has a memory storage location for each of the segments of array 152. Each of the memory locations corresponds to a range of target ID values, that is, a particular narrow range of phase characteristics for the target signal. When the target has been identified to have a particular target ID value, the microprocessor 56 sets a display bit in the corresponding location of the target ID register to cause the corresponding one of the segments in target array 152 to be illuminated. After this is done, operation is carried out in block 240 to display the target ID register on the upper scale of display 150. The upper scale comprises the segments of target array 152. Thus, the one of these segments, which corresponds to the physical characteristics of the target, is illuminated.

The target ID register can be either a register in the microprocessor 56 as a logical register handled by the software in operation by the microprocessor.

Following the operational block 240, entry is made to a decision block 242 in which the contents of the target ID register are compared with the contents of the discrimination register. The discrimination register functions to activate the segments of discrimination array 154. The discrimination register has a memory storage location corresponding to each of the segments of array 154. Note, as described above, each of the segments within the segments of array 154 corresponds to a particular physical characteristic of a target and likewise the segments in array 154 correspond on a one-to-one basis to the segments of array 152. Thus, within operational block 242 a comparison is made to determine which of the corresponding memory locations have similar values (bits) to indicate that a target has been found with a particular target ID value and the operator has previously set a similar discrimination value into the discrimination register. If there is a comparison, the accept exit is taken to an audio response block 244 in which the microprocessor 56 generates a control signal to the audio circuit 58 to produce an audio signal to the operator to indicate that a desired target object has been detected.

If the decision block 242 determines that there are no comparisons between the target ID register and the discrimination register, therefore no target object has been found which corresponds to what was set in the discrimination register, the reject exit is taken to an operational block 246 and the microprocessor 56 does not send any type of audio control signal to the audio circuit 58. However, note that the target segments of array 152 are illuminated showing the type of target found so that the operator visually knows that a target has been found and that it has a particular physical characteristic. The outputs from the blocks 244 and 246 transfer control of the microprocessor 56 back to the operational block 232 to again store received values and monitor for the detection of a target. Further details of the operations described in reference to FIG. 7 are presented in FIGS. 8, 9 and 10.

Referring now to FIG. 8, there is shown a more detailed explanation of the operation which occurs within operational block 232 in FIG. 7. The function of this block is to identify the presence of a target signal within the received signal. This is done by examining the slope of the vector signals S1 and S2. In a decision block 250, an inquiry is made to determine if the difference between the signal component S1H(N) and S1H(N-3) is greater than zero. This indicates that the S1 signal has a positive slope. If this difference is not greater than zero, the no exit is taken and return is made to the operational block 230 to again receive values for the received signal. If the answer to the inquiry in operational block 250 is positive, the yes exit is taken to a decision block 252 in which an inquiry is made to determine if S2H(N)−S2H(N-3) is greater than zero This inquiry determines if the slope is positive for the S2 signal. If the response to this inquiry is negative, the no exit is taken and return is made to the operational block 230. But, if the response to the inquiry is positive, the yes exit is taken and entry is made to the operational block 234 for processing of the target signal. The operations described in reference to FIG. 8 determine that there are positive slopes for the signals S1 and S2 at a particular time thereby indicating that a valid, non-ground, target signal is present for processing.

Referring to FIG. 9, there is illustrated a detail flow diagram representing the operations carried out in operational block 234 shown in FIG. 7. The function of the block 234 is to determine the range within which the target signal is present. The possible ranges are 121, 123, 125, 127, 129 or 131 as described in reference to FIGS. 3 and 4. Referring now to FIG. 9, from operational block 232, entry is made to a decision block 270 to determine if the difference between the S3 signal at two sample times is positive or negative. This is a determination of slope between the sample points N and N-3. If the response is negative, the no exit is taken and entry is made to an operational 272 in which the bottle cap range, range 123, is selected. Following block 272, return is made to the operational block 236 for the arithmetic determination of the target ID value, which corresponds to one of the segments 152.

If the determination in decision block 270 is positive, the yes exit is taken to a decision block 274. Within block 274, the determination S4H(N)−S4H(N-3) greater than zero is made. This likewise is a comparison of the amplitude of the signal S4H at two different times separated by three samples The approximate sample rate for the analog-to-digital converter 54 for use in the present invention is at five millisecond intervals. If the response in decision block 274 is negative, the no exit is taken and entry is made to operational block 276 in which the nickel range, which is range 125, is set. Control is then transferred from operational block 276 to the block 236.

If the response to the inquiry in operational block 274 is positive, that is the slope of the S4 signal is positive, the yes exit is taken to a decision block 278 in which the inquiry is made for S5H(N)−S5H(N-3) greater than zero. If this inquiry is negative, the no exit is taken and entry is made to an operational block 280 in which range 127 is set for the type of targets corresponding to pull-tabs. Following block 280, return is made to operational block 236.

If the response to decision block 278 is positive, then the yes exit is taken to a decision block 282 in which the inquiry is made for S6H(N)−S6H(N-3) greater than zero. If this inquiry is negative, the no exit is taken to an operational block 284 in which range 129 is set. This corresponds to objects such as rings.

Following operational block 284, return is made to operational block 236 for further signal evaluation.

If the response in decision block 282 is positive, the yes exit is taken to an operational block 286 in which range 131 is set. This range corresponds to objects such as coins. Following block 286, control is transferred to operational block 236.

In summary, the operations carried out in this reference to FIG. 9 comprise determining which of the ranges the target signal is in as shown in FIG. 4.

Figure 10:
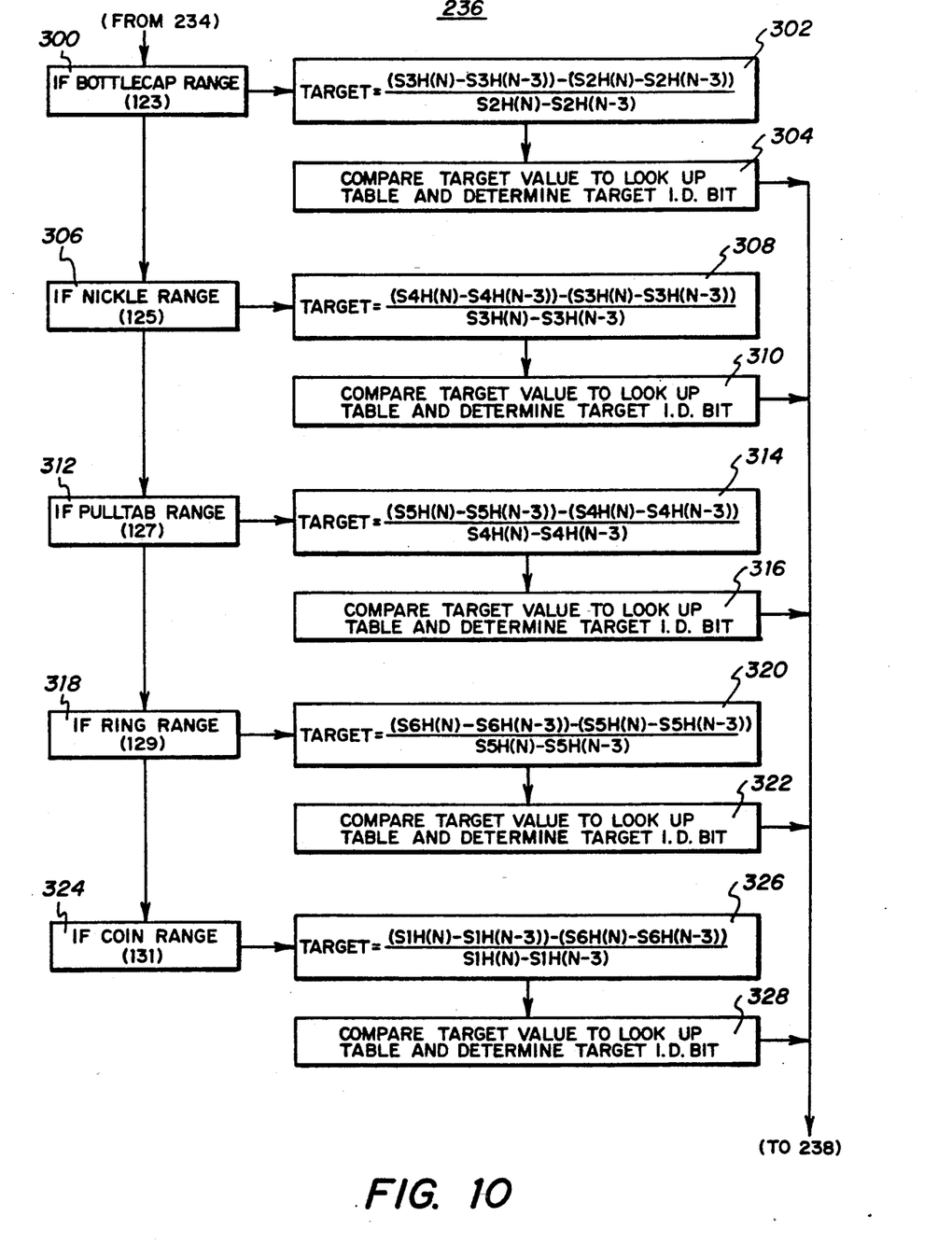
FIG. 10 is a detailed flow diagram illustrating the steps which are carried out in the operational block 23 of FIG. 7 for determining target identification values which in turn determines which segment of the target segments of the display are illuminated.

Referring now to FIG. 10, there is shown in detail the operations which are specified for operational block 236 shown in FIG. 7. The overall function of block 236 is to determine a particular target ID value within a determined range for the target signal. As described above, the range is determined in operational block 234. The functions carried out in operational block 236 comprise determining a subphase range for the target signal within the determined range. Each of the subphase ranges corresponds to one of the display segments 160 of target array display 152. There are no display segments for range 121, which is a soil response. Range 123 has five segments, each of which corresponds to a particular subphase range of the range 123. Range 125 has three segments and corresponding three subphase ranges. Range 127 has three segments, range 129 has five segments and range 131 has eight segments.

Operational block 234 determines the range in which a target signal is present and operational block 236 determines which of the subphase ranges the target signal is present for selecting one of the segments 152.

Further referring to FIG. 10, entry is made to a first operational block 300 for determining if the bottle cap range has been previously determined. If so, the yes exit is taken to an operational block 302 in which signal processing is performed using the S2 and S3 signals at offset time points. This mathematical function is shown in operational block 302. The result of this processing is a target value, a number. Following operational block 302, control is transferred to an operational block 304 in which the target value is applied to a look-up table to determine the corresponding target ID bit, that is the subphase range within the range 123. As noted above, there are four subphase ranges. Therefore, all the possible target values have to fall into one of these four possible sub-ranges.

If the response at the block 300 is negative, the no exit is taken to an operational block 306 to determine if the range 125 has been previously determined in block 234. If so, exit is made to an operational block 308 to carry out a target value computation as shown within this block. This produces a number for a target value. The range for block 308 is 125 which has three segments of the array 152. This number is then used in the next sequential operational block 310 where it is applied to a look-up table for determination of a target ID bit. There are three possible bits which can be selected, which correspond to the segments 152 for the range 125. The result of the operation in block 310 is identification of one of these three bits. Following block 310 control is returned to operational block 238.

If the response in block 306 is negative, control is transferred to an operational block 312 in which it is determined if the range 127 for pull-tabs has been previously selected. If so, control is transferred to an operational block 314 in which an algebraic operation is carried out with the S4 and S5 signals to produce a number for a target value. Following operational 314, control is transferred to an operational block 316 in which the target value is applied to a look-up table to determine the corresponding target ID bit. There are three possible bit locations for range 127 as corresponding to the segments 152 illustrated in FIG. 5. Upon selection of one of these three bits, control is transferred from operational block 316 to the operational block 238.

If the operational block 312 has a negative response, the no exit is taken to an operational block 318 in which determination is made if the range 129 has been selected in block 234. If so, control is transferred to an operational block 320 in which an algebraic operation is conducted to determine a target value utilizing the signals S5 and S6 which existed at times N and N-3. Following calculation of the target value in block 320, control is transferred to an operational block 322 in which the determined target value is applied to a look-up table for selecting a target ID bit, corresponding to one of the possible five segments 152 in the display 150. Once a selection is made for this target ID bit, control is transferred to operational block 238.

If the block 318 determines that the range 129 has not been selected, control is transferred to an operational block 324 to determine if the coin range 131 has been selected. If so, control is transferred to an operational block 326 in which an algebraic operation is conducted to determine the target value based upon the signals S1 and S6. Following the operational block 326, this numeric target value is applied in operational block 328 to a look-up table for determining the target ID bit. There are eight bits possible for range 131, each of these bits corresponding to the segments of array 152 within the range 131. Following the selection of the target ID bit in operational block 328, control is then transferred to the operational block 238.

All of the sub-ranges are essentially uniformly distributed across the individual ranges.

In summary, the present invention is a metal detector in which there is provided a display and touchpad such that the operator can select to either accept or reject particular target signals associated with certain types of targets. This is the operator's discrimination function and the results of the selection is displayed in a linear array of segments, each of which may have a reflective or nonreflective state. In operation, the circuitry of the metal detector processes the received signal to produce multiple target vector signals These signals define a plurality of phase ranges and the target signal is classified within one of these ranges. Further algebraic operations upon the pair of signals which define the phase range are carried out to select a discrete subphase range that more precisely defines a characteristic of the signal, which corresponds to a physical characteristic of the target object This is determined by producing a target ID value. Once this value is determined, a segment of the display 152 is illuminated to indicate the nature of the object which has been detected. If the illuminated segment corresponds to a previously selected segment in the discrimination, array 154, there is produced an audio output to the operator indicating that the target selected by discrimination had been found.

Although one embodiment of the invention has been illustrated in the accompanying drawings and described in the foregoing detailed description, it will be understood that the invention is not limited to the embodiment disclosed, but is capable of numerous rearrangements, modifications and substitutes of parts and elements without departing from the scope of the invention.

What is claimed is:

1. A target characterization display for a metal detector which produces a detection signal for objects in a region of the detector, comprising:
   a first set of arrayed display segments each having first and second display states,
   a discrimination memory having respective storage locations therein corresponding to each of said display segments in said first set, each discrimination memory storage location corresponding to a unique signal parameter for metal detector targets and wherein the value stored in each of said discrimination memory storage locations controls the display state for the corresponding display segment,
   a second set of arrayed display segments each having first and second display states, said second set of display segments positioned proximate said first set of display segments and having a correspondence between the segments of said first set and said second set, and
   a target memory having respective storage locations therein for each of said display segments in said second set, wherein the values in said target memory storage locations are derived from phase detected signals and wherein the value in each of said target memory storage locations controls the display state for the corresponding display segment.

2. A target characterization display for a metal detector as recited in claim, further including:
   means for detecting when corresponding ones of said storage locations in said discrimination and target memories have been set to values for driving the corresponding display segments to an active display state, and for generating a control signal upon said detecting, and
   an audio output circuit connected to receive said control signal and for producing an audio output upon receipt of said control signal.

3. A target characterization display for a metal detector which produces a detection signal for objects in a region of the detector, comprising:
   a first set of linearly arrayed display segments each having first and second display states,
   a discrimination memory having respective storage locations therein corresponding to each of said display segments in said first set, each discrimination memory storage location corresponding to a unique signal parameter for metal detector targets and wherein the value stored in each of said discrimination memory storage locations controls the display state for the corresponding display segment,
   a second set of linearly arrayed display segments each having first and second display states, said second set of display segments positioned essentially in parallel with said first set of display segments and having a one-to-one correspondence between the segments of said first set and said second set, and
   a target memory having respective storage locations therein for each of said display segments in said second set, wherein the values in said target memory storage locations are derived from phase detected signals and wherein the value in each of said target memory storage locations controls the display state for the corresponding display segment.

4. A target characterization display for a metal detector as recited in claim 3, further including:
   means for detecting when corresponding ones of said storage locations in said discrimination and target memories have been set to values for driving the corresponding display segments to an active display state, and for generating a control signal upon said detecting, and
   an audio output circuit connected to receive said control signal and for producing an audio output upon receipt of said control signal.

5. A target characterization display for a metal detector which has transmit and receive coils for producing a detection signal and phase detection circuits for producing phase detected target signals from said detection signal, comprising:

a first set of linearly arrayed display segments, each having first and second display states, a discrimination memory having respective storage locations therein corresponding to each of said display segments in said first set, each discrimination memory storage location corresponding to a unique signal parameter for metal detector targets and wherein the value stored in each of said discrimination memory storage locations controls the display state for the corresponding display segment, a second set of linearly arrayed display segments each having first and second display states, said second set of display segments positioned essentially in parallel with said first set of display segments and having a one-to-one correspondence between the segments of said first set and said second set, and a target memory having respective storage locations therein for each of said display segments in said second set, wherein the values in said target memory storage locations are derived from said phase detected signals and wherein the value in each of said target memory storage locations controls the display state for the corresponding display segment.

6. A target characterization display for a metal detector as recited in claim 5, further including:

means for detecting when corresponding ones of said storage locations in said discrimination and target memories have been set to values for driving the corresponding display segments to an active display state, and for generating a control signal upon said detecting, and an audio output circuit connected to receive said control signal and for producing an audio output upon receipt of said control signal.

7. A method of operation for a signal processing circuit used in conjunction with a metal detector circuit which produces multiple detection signals that represent a target vector signal related to target object composition, the method comprising the steps of:

producing first and second vector signals which are related to target composition, producing a plurality of vector signals which are algebraic combinations of said first and second vector signals, examining each of said vector signals to determine a pair of said vector signals which encompasses the target vector signal, algebraically combining the pair of vector signals to produce a target identification value, and determining within which one of a plurality of predefined subphase ranges, which are between said pair of vector signals, said target identification value is present, thereby indicating a characteristic of the target object.

* * * * *

UNITED STATES PATENT AND TRADEMARK OFFICE
CERTIFICATE OF CORRECTION

PATENT NO. : 5,148,151

DATED : September 15, 1992

INVENTOR(S) : Podhrasky

It is certified that error appears in the above-identified patent and that said Letters Patent is hereby corrected as shown below:

Col. 1, line 19, immediately following the word "phase", please insert -- characteristics --.

Col. 1, line 45, please delete the word "exist" and substitute therefor the word -- exists --.

Col. 1, line 47, please delete the second occurrence of the word "for".

Col. 2, line 45, immediately following the words "FIG. 4 is a", please insert --phase--.

Col. 2, line 54, immediately following the word "of", please insert -- the present --.

Col. 2, line 62, immediately following the word "determining", please insert -- a range --.

Col. 2, line 65, please delete the numeral "23" and substitute therefor -- 236 --.

Col. 3, line 10, please delete the punctuation mark ",".

Col. 3, line 55, please delete the second occurrence of the punctuation mark ",".

Col. 4, line 24, please delete the punctuation mark ",".

Col. 8, Line 23, immediately following the word "target", please insert -- , --.

UNITED STATES PATENT AND TRADEMARK OFFICE
CERTIFICATE OF CORRECTION

PATENT NO. : 5,148,151
DATED : September 15, 1992
INVENTOR(S) : Podhrasky

It is certified that error appears in the above-identified patent and that said Letters Patent is hereby corrected as shown below:

Col. 11, Line 47, immediately following the word "discrimination", please delete the punctuation mark -- , --.

Col. 12, Line 19, immediately following the word "claim", please insert -- 1 --.

Col. 14, Line 26, immediately following the word "between", please insert -- the vector signals of --.

Signed and Sealed this

Twenty-eighth Day of December, 1993

Attest:

BRUCE LEHMAN

Attesting Officer

Commissioner of Patents and Trademarks